Patented Oct. 13, 1936

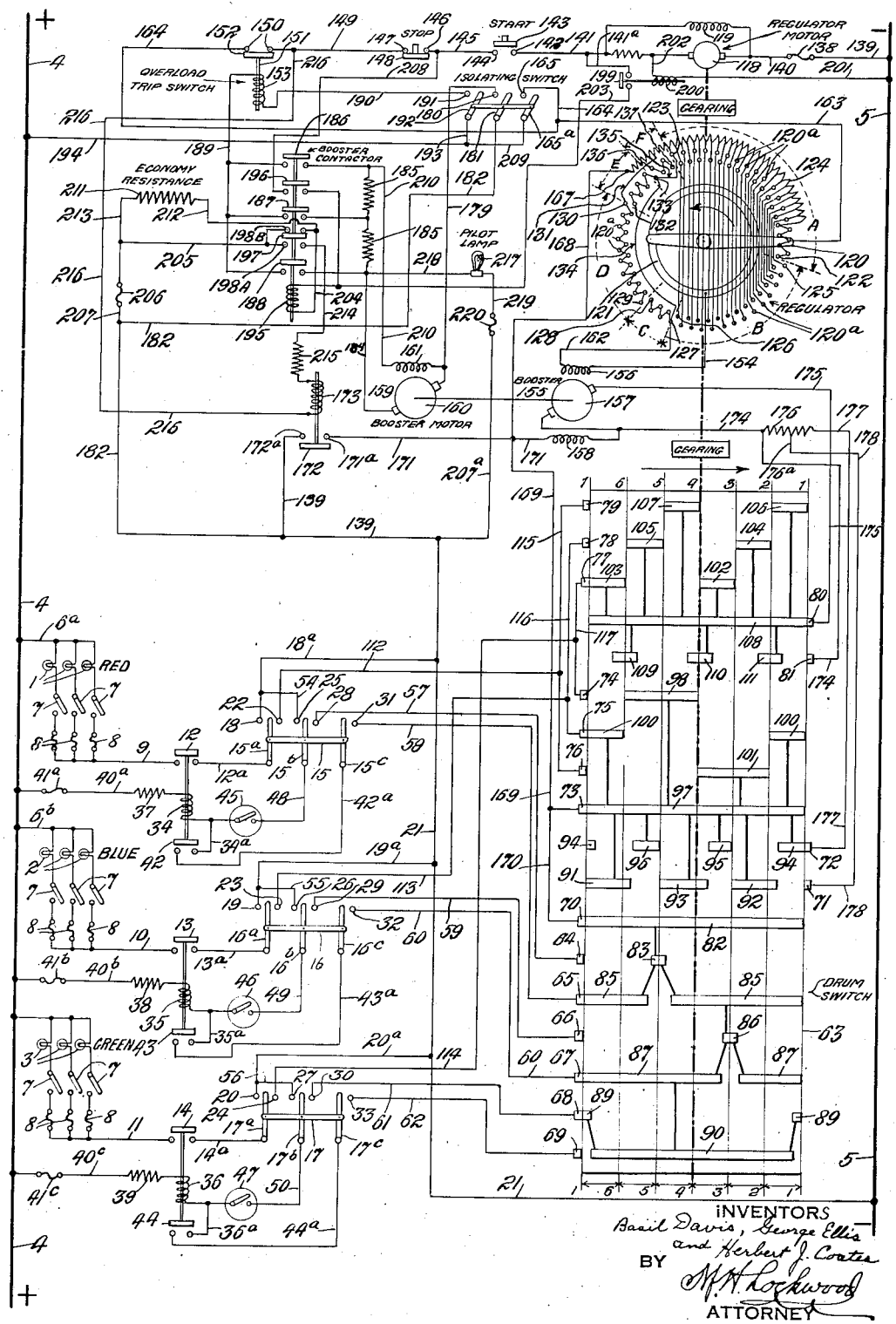

2,057,184

UNITED STATES PATENT OFFICE 2,057,184

ELECTRIC LIGHTING SYSTEM

Basil Davis, Brockley Hill, Stanmore, George Ellis, Shepherd's Bush, London, and Herbert John Coates, Erdington, Birmingham, England, assignors to The General Electric Company Limited, London, England Application August 1, 1933, Serial No. 683,172
In Great Britain August 4, 1932

6 Claims. (Cl. 177—346)

This invention relates to electric lighting systems adapted to give illumination in a plurality of colours, one object being the provision of improved, convenient and economical apparatus for controlling the dimming of electric lights. Although applicable in other spheres the invention is particularly useful for ballroom lighting.

According to the invention, in an electric lighting system, intended for example for ballroom lighting, a negative booster and automatic boosting means are adapted to automatically and periodically dim a lamp or group of lamps. Preferably the electric lighting system here involved is adapted to give illumination in a plurality of colours either simultaneously or separately and the negative boosting means is provided and so arranged as to sequentially dim a lamp group or a plurality of lamp groups.

In one arrangement in accordance with the invention a field regulator for the booster and switching means (drum switch) adapted for associating the booster with different lamp circuits are driven by a common device such as an electric motor. According to a further feature of the invention it should be observed that during operation the different lamp circuits may individually be completed or interrupted, but means are provided whereby a lamp circuit can not be interrupted or completed except when the booster has substantially dimmed the lamp or lamps thereof. Preferably also the switching means, for instance a drum switch is adapted to control the circuits of the lamps or lamp groups in such a way that during each complete revolution of the drum switch each lamp circuit is associated with the booster when the latter is effective to dim the lamp or lamps connected in the circuit, is then rendered independent of the booster when the latter is ineffective to dim the lamps, and then reassociated with the booster when the latter is ineffective to dim the lamps and is finally dissociated from the booster when the latter is effective to dim the lamps. Furthermore a lamp circuit may be controlled so that at times it is operatively associated with the booster, while at other times it is associated with a power supply independent of the booster and during the transfer the booster or a part thereof is shunted or short circuited. In such arrangement, the shunting or short circuiting is preferably effected in stages. Moreover it is preferably arranged that prior to the transfer of a lamp circuit from operative association with the booster to association with an independent power supply, a field winding of the booster is given a small reversed excitation.

The accompanying diagrammatic drawing shows one arrangement of circuits and devices for carrying out the invention.

Referring to the drawing, the arrangement shown comprises three sets of electric incandescent lamps 1, 2, 3 which are assumed respectively, for example, to be of red, blue and green colours. The positive and negative supply bus-bars are shown respectively at 4 and 5 and one side of each of the lamps in the groups 1, 2, 3 is connected to the positive bus-bar 4 by lines 6a, 6b, 6c. The groups of lamps 1, 2, 3 are, on the side remote from the bus-bar 4 connected through individual "on-off" switches 7 and individual fuses 8 to leads 9, 10, 11, common to the lamps of the respective groups, the leads 9, 10, 11 being connected respectively to contacts on one side of the main group contactors 12, 13, 14. The contact on the other side of each group contactor is connected through leads 12a, 13a, 14a to the movable contactors 15a, 16a, 17a of the multiple pole double throw switches 15, 16, or 17. The movable contactors 15a, 16a, 17a of the switches 15, 16, 17 are respectively adapted to cooperate with contacts 18, 19, 20 when moved to the left and contacts 22, 23, 24 when moved to the right, the contacts 18, 19, 20 of which are connected by leads 18a, 19a, 20a to a common lead 21 connected to the negative bus-bar 5.

Auxiliary contacts 25, 26, 27 connected by leads 54, 55, 56 to leads 18a, 19a, 20a and thence by lead 21 to the negative bus-bar 5, are arranged to cooperate with the central movable contactors 15b, 16b, 17b on switches 15, 16, 17 and are adapted to be closed on closure of the associated contacts 18, 19, 20. Similarly, auxiliary contacts 28, 29, 30 arranged to cooperate with movable contactors 15b, 16b, 17b and contacts 31, 32, 33 arranged to cooperate with movable contactors 15c, 16c, 17c are adapted to be closed on the closing of the associated contacts 22, 23, 24, when the movable contactors of switches 15, 16, 17 are moved to the right.

The contactors 12, 13, 14 are provided with operating coils 34, 35, 36, connected through economy resistances 37, 38, 39 which by lines 40a, 40b, 40c are connected through fuses 41a, 41b, 41c to the positive bus-bar 4. Associated with and closing at the same time as the main contactors 12, 13, 14 are auxiliary contactors 42, 43, 44 each having one cooperating contact connected by leads 34a, 35a, 36a with the respective operating coil 34, 35, 36 on the side remote from the connecting lines 40a, 40b, 40c, and the other contact connected by leads 42a, 43a, 44a, with movable contactors 15c, 16c, 17c. Also connected to leads 34a, 35a, 36a and extending from the same sides of the contactor closing coils 34, 35, 36 are tumbler switches 45, 46, 47 connected by lines 48, 49, 50 to the respective central movable contactors 15b, 16b, 17b of switches 15, 16, 17 which contactors are adapted to cooperate with the respective contacts 25 and 28, 26 and 29, and 27 and 30.

The contacts 25, 26, and 27 of switches 15, 16, 17, as previously explained, are connected by lines 54, 55, 56 to the common line 21 leading to negative bus-bar 5. However, contacts 28, 31 of switch 15; 29, 32 of switch 16; 30, 33 of switch 17 are connected respectively by lines 57, 58; 59, 60; 61, 62 to contact fingers 64, 65; 66, 67; 68, 69 of a drum switch controller 63. The drum switch controller 63 is preferably provided, in addition to the contact fingers 64 to 69, with contact fingers 70 to 81 inclusive. The contact fingers 64 to 81 of the drum switch controller are adapted to be engaged respectively by drum switch segments as follows: 64 by 83; 65 by 85; 66 by 86; 67 by 87; 68 by 89; 69 by 90; 70 by 82; 71 by three parts 91, 92 and 93; 72 by three parts 94, 95 and 96; 73 by 97; 74 by 98; 75 by 100 (shown divided); 76 by 101; 77 by 102 and 103; 78 by 104 and 105; 79 by 106 and 107; 80 by 108; 81 by 109, 110 and 111.

The contacts 22, 23 and 24 of the switches 15, 16 and 17 are connected by lines 112, 113 and 114 to the drum switch fingers 79, 78, 77 respectively and will be seen on the drawing, the finger 79 is connected by a lead 115 to the finger 76; the finger 78 by a lead 116 to the finger 75, and the finger 77 by a lead 117 to the finger 74.

The controller or drum switch 63 is adapted to be rotated through the intermediary of gearing (not shown) by a regulator motor having an armature 118 and a shunt field winding 119, which, through suitable gearing, also drives, in a counter-clockwise direction, a regulator arm 120, one end of which engages a slip ring 121, while the other end, as the arm is rotated, is adapted to cooperate with circularly arranged contacts 120a of a regulator, the circuit connections of which will be hereinafter described. It should be noted that the gearing connections between the regulator arm 120 and the drum switch 63 are to be so arranged that the arm 120 performs three revolutions in the time that the drum switch performs one. In the arrangement, as shown in the drawing, the drum switch 63 is in its starting position.

In the regulator the contacts 120a over which the regulator arm 120 moves, are divided into six sets. Regulator set A lying between end contacts 122 and 123 has all intermediate contacts 120a connected to tappings on a potentiometer resistance winding 124. Regulator set B having end contacts 125 and 126 has all intermediate contacts 120a connected to corresponding contacts in regulator set A. Regulator set C having end contacts 127, 128 has all the contacts 120a in the set connected one with another in series. Regulator set D having end contacts 129, 130 has all its contacts 120a connected one with another in series and the end contact 130 by a line 131 is connected to a tapping towards the end 167 of the resistance 124. Regulator set E having end contacts 132, 133 has all its contacts 120a connected one with another in series and its end contact 133 is connected by a line 134 with the end contact 127 of regulator set C and by a line 135 with the end contact 123 of the regulator set A. Regulator set F having end contacts 136, 137 has its contacts 120a connected with each other in series and the end contact 136 is connected to the end tapping on the resistance winding 124.

One side of the armature 118 and the shunt field winding 119 of the regulator motor driving the regulator arm 120 and the drum switch 63, is connected through line 140 and a fuse 138 to a line 139a connected to the negative bus-bar 5. The armature 118 is connected, on the side remote from the line 139a, 140 with a line 141 connected to one contact 142 of a normally open "start" push button switch 143, whose other contact 144 is connected by a line 145 with one contact 146 of a normally closed "stop" push button switch 148 having a second contact 147. The contact 147 is connected by a line 149 to one of the contacts 150 of an overload trip switch 151 having a movable contact member 152 and a trip coil 153.

Reverting now to the "regulator" member constituted by the rotating regulator arm 120 and the regulator contact sets A to F, it will be seen that the slip-ring 121 is connected by a line 154 with the one end of the shunt field coil 156 of a booster 155 having an armature 157 and series field coil 158. The booster 155 is driven by a booster motor 159 having an armature 160 and a shunt field coil 161. The other end of the shunt coil 156 of the booster 155 is connected by a line 162 to the end contact 127 of the regulator contact set C. The end contact 122 of regulator set A is connected by a lead line 163 with the left contact 150 of the overload trip switch 151 and by a branch line 164 to an auxiliary contact 165 on the isolating switch 166. The end terminal 167, that is the other end of the resistance 124 is connected by a line 168 to a line 169 extending between the drum switch fingers 73 and 70 (the finger 70 being connected to finger 73 by a line 170) and one end of the series field coil 158 of the booster 155. This same end (line 169) of the booster series field coil 158 is connected by a line 171 to the contact 171a of a contactor 172, having a closing coil 173, the other contact 172a of which by the line 139 is connected to the line 21 which leads to the negative bus-bar 5. The other side of the booster series field coil 158 and one side of the booster armature 157 are connected by a line 174 to the contact finger 81 on the drum switch 63. The side of the booster armature 157 remote from the line 174 is connected by a line 175 with the contact finger 80 on the drum-switch 63.

Also connected to the common side (line 174) of the booster series field coil 158 and the booster armature 157 is a shunting resistance 176 the end of which is connected by a line 177 with the contact finger 72 on the drum switch 63; and a tapping 176a on the resistance 176 is connected by a line 178 with the contact finger 71 on the drum switch 63.

One side of the booster motor armature 160 and the shunt field winding 161 of the booster motor 159 are connected by a line 179 to a contact 180 of the isolating switch 166 and when the said switch 166 is closed, the contactor member 181 of the switch closes on contact 180 and completes the circuit, contactor 181 by the lines 182, 139 and 21 being connected to the negative bus-bar 5. The other end of the booster motor armature 160 is connected by a line 184 to a series resistance 185 having its other end and a number of tappings connected to contacts on a booster motor starting contactor; the entire resistance 185 being adapted to be connected in series with the booster motor armature 160 by a contactor 186 and its cooperating contacts, partly cut out by a contactor 187 and its cooperating contacts and wholly cut out by a contactor 188 and its cooperating contacts. The contacts cooperating with contactors 186, 187, 188 are, on the side opposite the resistance connections, commoned and connected by a line 189 to the coil 153 of the overload trip switch 151 which by a line 190 is connected to a contact 191 of the isolating switch 166, the contactor 192, of which by lines 193 and 194 is connected to the positive bus-bar 4.

The booster contactor set 186, 187, 188 is provided with a closing coil 195 which closes contactor 186 first, and is of the type in which the successive closing of contactors 187, 188 is preferably determined by time-delay mechanism (not shown). The motor starting contactor assembly 186–188 is also provided with an auxiliary contactor 196, adapted to close with contactor 186: and a "changeover" contactor 197, normally closed on contacts 198B, but when operated simultaneously with contactor 187 is adapted to close on contacts 198A.

The operating coil 195 of the booster contactor assembly 186, 187, 188, 196, 197 is adapted to be energized on the closing of a contactor 199 provided with an operating coil 200 connected by leads 201, 202 between one end of the armature 118 of the "regulator" motor and the negative bus-bar 5. The energization of the booster contactor operating coil 195 is effected when the regulator motor has attained a reasonable speed at which time the contactor 199 closes to complete the circuit over lines 141, 141a, contactor 199, line 203, operating coil 195, line 204, contacts 198B through contactor 197, line 205, control circuit fuse 206 and lines 182, 139, 21, to the negative bus-bar 5. The regulator motor (armature 118) starts immediately upon depression of the "start" switch 143 since it is then energized by a circuit from bus-bar 5 through line 139a, fuse 138, line 140, the armature 118 and shunt 119 then over the line 141, closed start switch 143, line 145, stop switch 148, line 149, overload trip switch 151, line 164, contact 165, contactor 165a of isolating switch 166, line 209 to positive bus-bar 4 by line 194. When the regulator motor attains the prearranged speed, the contactor 199 operates to close the circuit of the booster contactor operating coil 195 thus closing contactors 186 and 196. The closing of contactor 196 makes a maintenance circuit through coil 195 for the booster contactor from negative bus-bar 5, lines 21 and 139, over line 182, fuse 206, line 205, contact maker 197 and contacts 198B, line 204, closing coil 195 of the booster contactor, contactor 196, lines 208, 145, contact 146, "stop" switch contactor 148, contact 147, line 149, contacts 150 and contactor 152, line 164, contact 165 of isolating switch, contactor 165a, line 209, and line 194 to the positive bus-bar 4. After the predetermined time delay set by the mechanism operating the booster contactor (186—197), which is sufficient to ensure that the booster motor 159 has run up to speed (the field 161 of the booster motor is completed on closing of the contactor 186 over the line 210), the successive closing of the contactors 187 and 188 having cut out the resistance 185 in steps, the changeover contactor 197 in the meantime is moved away from contacts 198B to thereby insert an economy resistance 211 in the maintenance circuit through the operating coil 195 of the booster contactor over lines 212, 213, connected respectively to lines 204 and 205. At the same time contactor 197 by making with the contacts 198A, completes a circuit from the negative bus-bar 5 over lines 21, 139, 182, 207, fuse 206, line 205, contact maker 197 (in lower position), contacts 198A, line 214, economy resistance 215, operating coil 173 of contactor 172, line 216, contacts 150, contactor 152, line 164, contact 165 of isolating switch 166, line 209, line 194 to positive bus-bar 4, which results in the contactor 172 being closed and thus completes the output circuit from the booster 155 through the series field 158, lines 169, 171, contacts 171a, 172a and contactor 172, lines 139 and 21 to negative bus-bar 5, which it will be understood is arranged to supply a negative boost in opposition to the main line supply. A pilot lamp 217 is provided which is energized over the lines 218, 219 and fuse 220, line 207a, lines 139 and 21 to the negative bus-bar 5 on completion of the booster motor circuit upon the closing of contactor 186 of the booster contactor.

In order that a better understanding of the invention may be gained, there will now be described the complete operation of the arrangement.

It is assumed that the desired lamps of the banks 1, 2, 3 have been selected by closure of the corresponding switches 7. The nature of the illumination desired from the lamps (i. e. periodically dimmed or steady) is determined by the multiple pole double throw switches 15, 16, 17; for instance when these switches are in the left position, that is when contactors 15a, 16a, 17a are on contacts 18, 19, 20, the lamps will be, on closure of the group contactors 12, 13, 14, connected directly between the bus-bars 4 and 5, over lines 6a, 6b, 6c from positive 4, lamp groups 1, 2, 3, lines 9, 10, 11, contactors 12, 13, 14, lines 12a, 13a, 14a, contactors 15a, 16a, 17a, contacts 18, 19, 20, lines 18a, 19a, 20a, to common return line 21 to negative bus-bar 5. When, however, the switches 15, 16, 17 are in the right hand position, in which the contactors 15a, 16a, 17a are on contacts 22, 23, 24 the lamp groups will be successively dimmed by the negative boost from the booster in a manner as will be hereinafter described.

The closure of the desired group contactor, 12, 13, 14, will now be described with reference to contactor 12, since the operation is similar for the remaining contactors 13 and 14. When the double throw switches 15, 16, 17 are in the left position, the contactor 12 is closed by means of the tumbler switch 45. When this switch 45 is closed a circuit is completed from the positive bus-bar 4, through the control circuit fuse 41a, over line 40a, economy resistance 37, contactor coil 34, tumbler switch 45, line 48, contactor 15c on contact 25 (which were closed with the closing of the switch 15 in the left position) line 54, line 18a, line 21 to negative bus-bar 5. In this manner the operating coil 34 is energized to close the contactor 12, and contactor 12 will remain closed until the switch 45 is opened, or until the circuit through contact 25 is opened by opening the double throw switch 15. In this position the illumination will be steady.

If, on the other hand, it is desired to have all three groups of lamps 1, 2, 3 periodically dimmed in prearranged rotation, the switches 15, 16, 17 are moved to their right hand positions in which main contacts 22, 23, 24 and auxiliary contacts 28 and 31, 29 and 32, 30 and 33 are made. The tumbler switches 45, 46 and 47 and the isolating switch 166 should be also closed. The "start"

switch 143 is then pressed which causes the completion of a circuit from the negative bus-bar 5 over line 139c, fuse 138, line 140, through the armature 118 and field 119 of the regulator motor, over the line 141, contact 142 and contact member 143, contact 144, line 145, contact 146, "stop" contact member 148, contact 147, line 149, overload trip switch 152 and its contacts 150, line 164, contact 165, (isolating switch 166) contactor 165a, line 209 and line 194 to positive bus-bar 4.

The regulator motor is thus set in rotation, and after it has speeded up and the back E. M. F. across its armature 118 has built up, the operating coil 200 of the contactor 199 is energized to close its contactor 199 and thus to make the closing circuit from 141 and line 141a, through 199, line 203, booster contactor coil 195, line 204, contacts 198B and contactor 197, line 205, fuse 206, lines 207, 182, 139 and 21 to the negative 5, thus operating the coil 195 of the booster motor starting contactor assembly (186—187), which will cause energization of the booster motor 160; the circuit being from positive bus-bar 4 through lines 194, 193, contactor 192, of isolating switch 166, contact 191, line 190, overload coil 153, line 189, contactor 186 (of the booster contactor) resistance 185, line 184, booster motor armature 160, and for shunt field coil 161 from resistance 185 through line 210, line 179, contact 180 and contactor 181, of isolating switch 166, lines 182, 139, 21, to negative bus-bar 5. After the time delay determined by the delay mechanism associated with the booster contactor assembly, and when the booster motor is substantially up to speed, the "changeover" contactor 197 of the booster contactor is operated, that is, the contacts 198B are opened to insert the economy resistance 211 in the booster contactor operating coil 195 circuit, and contactor 197 makes with its contacts 198A and thereby completes the circuit of the operating coil 173 between lines 214 and 205, as has previously been described, which causes the contactor 172 to close.

For the simplification of the further description, it is assumed that when the contactor 172 closes, the drum-switch 63 and the regulator assembly are in the position shown in the drawing and that the regulator and drum switch rotate in the directions indicated by the respective arrows. Further, it will be noted that the drum switch is divided into six sections, indicated by dotted lines and numbered 1 to 6, the line 1 being the same on each side of the drum development shown. By the closing of contactor 172 a circuit is immediately completed from the positive bus-bar 4, through the control circuit fuse 41c and line 40c, through the economy resistance 39, operating coil 36, closed tumbler switch 47, line 50, contactor 17b, contact 30, line 61, contact finger 68, interconnected drum segments 89, 90, 87, 86, 85, 83, 82 respectively, contact finger 70, line 170, line 169, line 171, contactor 172 to the negative line 139, line 21 and negative bus-bar 5. The contactor coil 36 is energized and contactor 14 of lamp group 3 accordingly closes and, at the same time, auxiliary contactor 44 closes; and since the drum switch 63 is moving, its next movement will provide a holding circuit for contactors 14 and 44 which is completed over contactor 44 from line 36a through line 44a, contactor 17c, contact 33, line 62, contact finger 69, drum segment 90 and then over the same segments and lines, as just described, over which the closing circuit was completed.

Upon the drum switch 63 moving into position to bring section 3 under the contact fingers, a closing circuit for contactor 13 for lamp group 2 is set up, through the engagement of contact finger 66 and drum segment 86, which contactor 13 is thereafter held closed over a maintenance circuit through contact finger 67 and drum segment 87. At the same time, the contact finger 77 engages the drum segment 102 and completes a circuit from the positive bus-bar 4 through the group of lamps 3, (green) over line 11, contactor 14, contactor 17a and contact 24 of changeover switch 17, line 114, contact 117, contact finger 77, drum segment 102, drum segment 108, contact fingers 80, line 175, through the booster set 155 (armature 157 and series coil 158) and line 171, contactor 172, line 139 and line 20 to the negative bus-bar 5. The regulator will, however, be in the position shown, since it is performing three revolutions to one revolution of the drum; accordingly the voltage across the booster shunt field 156 is a maximum, and the booster will be yielding its maximum output, in opposition to the line supply. The lamps in bank 3 (the "green" lamps) will accordingly be dim. At the same time contact finger 72 (at right of drum) is engaging drum segment 95 (section 3) so that the shunting effect of the resistance 176 will be a minimum.

Continued rotation of the regulator arm 120 however in the counter-clockwise direction, as indicated by the arrow, will result in the voltage across the shunt field 156 of the booster being reduced, until when the rotating arm 120 engages contact 123, at the end of regulator set A, the voltage across the shunt field is zero; during this time the green lamps accordingly increase in brilliance. The arm 120 from contact 123 moves onto contact 137 (end contact of regulator set F) and a reverse current is applied to the booster shunt field 156 for a short time, to kill residual field flux in the booster, this is followed when the arm 120 engages the contact 133 by a short period of zero current through the shunt field 156. The contact finger 71 (at the right) by rotation of the drum then engages drum segment 93 and the shunting effect of the resistance 176 is in consequence increased by tapping 176a over line 178; and at the same time contact finger 81 engages drum segment 110 and thus the booster is short circuited, as explained later.

Next, on engagement of the regular arm 120 with the contact 130 a small reverse current is passed through the shunt field 156 of the booster set. The contact finger 74 at this time engages drum segment 98 and thus completes a lamp circuit for the "green" lamps 3, from the positive bus-bar 4 through the lamps 3, the group contactor 14, double throw switch 17, contact 24, line 114, line 117, contact finger 74, drum segment 98, drum segment 97, contact finger 73, line 169, line 171, contactor 172, line 139, line 21 and negative bus-bar 5. At the same time the booster 155 is short-circuited over lines 174, 175 at contact fingers 81 and 80 by the engagement with these contact fingers with connected drum segments 110 and 108. Also simultaneously with the short circuiting of the booster 155, disengagement of drum segment 95 from contact finger 72 and the engagement of contact finger 71 with drum segment 93, makes a change in the resistance 176, so that the current through the series field 158 is readjusted to a value which will allow the short circuit on the booster 155 to be opened without a sudden voltage change. The "green" lamps 3 then stay at full brilliance while the drum switch 63 moves into position in section 4 and will remain so until they are later transferred to drum segment 103.

On moving into position in section 3, the contact finger 78 engages with the drum segment 105 and hence the "blue" lamps in bank 2 are put in circuit in series with the booster which is then giving its maximum output, the "blue" lamps 2 are thus at first dim, but during the next revolution of the regulator (remembering that the regulator is making three revolutions to one for the drum) the "blue" lamps are brought up to brilliance as were the "green" lamps. The contact finger 64, now also in the fifth position, engages the short drum segment 83 and closes the group contactor 12 of the "red" lamps 1, the group contactor 12 being thereafter maintained closed over a circuit made by the engagement of contact finger 65 with drum segment 85 and thus the "red" lamp circuit is prepared, and again the shunting effect over resistance 176 is at a minimum through the engagement of contact finger 73 with drum segment 96.

In the sixth position the "blue" lamps 2 are fully lit and are transferred to the line, by engagement of drum segment 100 with contact finger 75. At the same time the "green" lamps 3 are, by disengagement of contact finger 74 from drum segment 98 and the engagement of drum segment 103 with contact finger 77, removed from the line and placed in series with the booster which is, at this time, short-circuited by engagement of contact finger 81 with drum segment 109, the shunting effect of resistance 176 being again at a minimum owing to the engagement of contact finger 71 with drum segment 91. The outer end contact of the regulator arm 120 is at this time travelling over regulator set D, accordingly, since the negative boost is not operative, the "green" lamps 3 remain at full brilliance.

As now the drum switch 63 completes its first revolution and moves into section 1, the first position, the booster output is again brought up to maximum by the increase of current through its shunt field winding 156, in the manner previously described, that is by movement of the regulator arm 120 over the regulator set marked B; accordingly the "green" lights are dimmed and the circuit therethrough is broken on the disengagement of contact finger 77 with drum segment 103. Assuming the tumbler switch 47, to have been left in the closed position, the group contactor 14 is held closed by a closing circuit made through drum segment 89 and contact finger 68.

At the same time, a circuit is completed at contact finger 79, by the engagement therewith of the drum segment 106, which inserts the "red" lamps 1 in series with the booster across the supply, the next movement of the drum switch and regulator will cause the "red" lamps to be brought up to full brilliance until, in position 2 the "red" lamps 1 are placed directly across the line by the engagement of contact finger 76 with the drum segment 101. The "blue" lamps 2 are then, by the engagement of contact finger 78 with drum segment 104 and the disengagement of drum segment 100 from contact finger 75, transferred from the line and put in series with the booster. At the moment of transfer the booster is short-circuited at contact finger 81, on drum segment 111, and the shunting effect of resistance 176 on the booster is at a maximum owing to the engagement of contact finger 71 with drum segment 92. The "blue" lamps 2 are subsequently dimmed.

Assuming that all the tumbler switches 45, 46, 47 are or remain closed, the cycle as described is continuously repeated, that is at any one time one colour is at full brilliance, one "off", and one fading "in" or "out". If during operation any one of the tumbler switches 45, 46, 47 is opened, the corresponding group contactor 12, 13, 14 will be held closed until the associated lamp group has been dimmed. For example, if it is desired to cut out the "red" lamps, the tumbler switch 45 is opened, then with the drum moving towards position 5, the holding circuit through contact finger 65 and drum segment 85 will be effective through coil 34 until position 5 is reached, then, since with the tumbler switch 45 open the temporary maintenance circuit through contact finger 64 and drum segment 83 will be open; coil 34 will be deenergized and the "red" lamp group contactor 12 opens, thus cutting out the group when the dimming circuit is at a maximum and most effective. Accordingly each group of lamps can only be cut out of circuit when the current through them is substantially zero or so small as not effectively to illuminate them.

The stopping of the booster and the cutting out of the device is effected by depression of the "stop" switch 148 which breaks the maintenance circuit through coil 195 of the booster contactor assembly (186—197) and stops the booster motor, and the "stop" switch also cuts out the booster circuit contactor 172.

It is of course to be understood that the arrangement, colours and grouping of the lamps in the several groups may be anything desired, and the number of groups may be varied according to requirements.

We claim:—

1. In an electric lighting system for changing the color scheme of lighting, a plurality of groups of colored lamps, circuits for lighting the groups from direct current bus-bars, individual switches for the bus-bar circuits of the respective groups, a booster generator having circuits arranged to deliver current in opposition to the bus-bar current through the lamps, controlling means for operating the respective group switches and for controlling the bus-bar and booster currents for lighting the groups of lamps in prearranged sequence, interlock contact means for the respective group switch circuits arranged to cooperate with the bus-bar and booster current controlling means so that the bus-bar circuits for the individual groups of lamps are opened and closed only at prearranged intervals in the application of the booster current, regulating means for automatically varying the booster current for dimming the respective groups of lamps according to a prearranged cycle, the booster current being varied from substantially nothing to maximum dimming for the lamps, said controlling means being arranged to cut out the booster generator when its current is at a minimum and ineffective to dim the lamps and means for continuously operating said controlling means and the booster current regulating means at prearranged synchronism so that the cycle of the booster current is applied to each group in succession.

2. In an electric lighting system for changing the color scheme of lighting, a plurality of groups of colored lamps, circuits for lighting the lamp groups from constant potential direct current bus-bars, electromagnetic switches for the bus-bar circuits of the respective groups, a booster generator capable of delivering current at the bus-bar potential, circuits arranged for delivering current from the booster in opposition to the bus-bar current through the lamps, a drum switch having contacts cooperating with circuits for controlling operation of said electro-magnetic switches and for controlling the bus-bar and booster circuits for lighting the respective groups of lamps in prearranged sequence, regulating means cooperating with said drum switch for varying the lighting effect by varying the voltage of the booster current and means for rotating the drum switch and said regulating means in a repeating cycle for controlling the lighting of each group of sequence.

3. In an electric lighting system for changing the color scheme of lighting, a plurality of groups of colored lamps, circuits for lighting the lamp groups from constant potential direct current bus-bars, electro-magnetic switches for the busbar circuits of the respective groups, a booster generator capable of delivering current at the bus-bar potential, circuits arranged for delivering current from the booster in opposition to the bus-bar current through the lamps, a rotatable drum switch having contacts cooperating with circuits for controlling operation of said electromagnetic switches and for controlling the busbar and booster circuits for lighting the respective groups of lamps in prearranged sequence, rotatable regulating means provided with tapped rheostat and tapped circuits for regulating the field of the booster and varying the potential of the booster current according to a prearranged cycle, and a motor for rotating the drum switch and said regulating means in a prearranged cycle such that a varying booster current is applied to the respective groups of lamps in sequence in a repeating cycle.

4. In an electric lighting system for changing the color scheme of lighting, a plurality of groups of colored lamps, circuits for lighting the lamp groups from constant potential direct current bus-bars, individual electro-magnetic switches for the bus-bar circuits of the respective groups, a booster generator capable of delivering current at the bus-bar potential, circuits arranged to deliver current from the booster in opposition to the bus-bar current through the lamps, a rotatable drum switch having contacts cooperating with circuits for controlling operation of said electro-magnetic switches and for controlling the bus-bar and booster circuits for lighting the respective groups of lamps in prearranged sequence, contactors and circuits associated with the respective group switches and arranged to cooperate with contacts controlled by the drum switch for operating and then maintaining said electro-magnetic switches so that the bus-bar circuits for the individual groups of lamps are opened and closed and the booster current applied thereto at prearranged intervals during rotation of said drum switch, rotatable regulating means for automatically varying the potential of the booster current and for varying the dimming effect on the respective groups of lamps in a prearranged cycle and means for continuously rotating the drum switch and said regulating means in predetermined ratio so that the dimming effect of the booster current is varied and applied to each group of lamps in succession in a repeating cycle.

5. In an electric lighting system for changing the color scheme of lighting, a plurality of groups of colored lamps, circuits for lighting the lamp groups from constant potential direct current bus-bars, individual electro-magnetic switches for the bus-bar circuits of the respective groups, a booster generator capable of delivering current at the bus-bar potential, circuits arranged to deliver current from the booster in opposition to the bus-bar current through the lamps, a rotatable drum switch provided with contacts cooperating with circuits for operating the individual electro-magnetic switches and for controlling the bus-bar and booster circuits for controlling the lighting of the respective groups of lamps in prearranged sequence, contactors associated with said bus-bar switches having circuits cooperating with contacts on said drum switch so that the bus-bar circuits for the respective groups of lamps are maintained closed and opened at prearranged intervals, said bus-bar switches being operated to open the circuit only when the booster current is at a minimum potential, regulating means for automatically varying the booster circuit for varying the dimming effect on the respective groups of lamps according to a prearranged cycle, said regulating means being provided with a tapped rheostat and tapped shunting circuits for varying the potential of the booster current, cooperating contacts associated with said drum switch for cutting out the booster current and establishing circuits for operating of the respective groups of lamps direct from the bus-bars, and means for rotating said drum switch and the regulating means in predetermined ratio such that for each rotation of the drum switch the regulating means is rotated as many times as there are groups of lamps, once for each group and this prearranged cycle is repeated.

6. In an electric lighting system for changing the color scheme of lighting, a plurality of groups of colored lamps, circuits for lighting the lamp groups from constant potential direct current bus-bars, individual electro-magnetic switches for the bus-bar circuits of the respective groups, a booster generator capable of delivering current at the bus-bar potential, circuits arranged to deliver current from the booster in opposition to the bus-bar current for dimming the lamps, a drum switch provided with contacts cooperating with circuits for operating the individual electro-magnetic switches and for controlling circuits of the bus-bar and booster for controlling the lighting of the respective groups of lamps in prearranged sequence, regulating means comprising a tapped rheostat and tapped field excitation controlling circuits for automatically varying the potential of the booster current to effect dimming of the respective groups of lamps according to a prearranged cycle, said circuits for controlling the booster field being associated with contacts on the drum switch arranged for operation in a prearranged cycle for controlling the field excitation of the booster generator, certain of said circuits and contacts being arranged to establish a small reverse excitation in the field winding of the booster generator during a portion of the dimming cycle, and means for rotating the drum switch and said regulating means in predetermined ratio, such that each group of lamps is dimmed in succession for each rotation of the drum switch.

BASIL DAVIS.
GEORGE ELLIS.
HERBERT JOHN COATES.